UNITED STATES PATENT OFFICE.

HERBERT H. DOW, OF MIDLAND, MICHIGAN, AND WALTER S. GATES, OF WORTHINGTON, ONTARIO, CANADA, ASSIGNORS TO THE ONTARIO NICKEL COMPANY, LIMITED, OF WORTHINGTON, CANADA, A CORPORATION.

PROCESS OF SEPARATING METALS IN SOLUTION.

No. 913,708.        Specification of Letters Patent.        Patented March 2, 1909.

Application filed April 3, 1907. Serial No. 366,159.

*To all whom it may concern:*

Be it known that we, HERBERT H. DOW and WALTER S. GATES, both citizens of the United States, residents of Midland, county of Midland, and State of Michigan, and Worthington, district of Algoma, and Province of Ontario, Canada, respectively, have invented a new and useful Improvement in Processes of Separating Metals in Solution, of which the following is a specification, the principle of the invention being herein explained and the best mode in which we have contemplated applying that principle, so as to distinguish it from other inventions.

Our invention relates to processes of separating metals and especially to a separation of the same, each substantially free of all the others, when contained in a water solution.

Said invention consists of steps hereinafter fully described and specifically set forth in the claims.

The improved results obtained by our new process are effected by reason of the fact which we have discovered that, when a reagent which is capable of precipitating at least one of the metals as an insoluble compound is added to a solution of metals—more or less of the insoluble compounds of the other metals are simultaneously precipitated, depending upon the circumstances of each particular case—if the degrees of insolubility of the insoluble compounds thus precipitated are different and vary among themselves within reasonable limits, and there be present in the original solution enough of the metal, which upon the addition of the reagent forms the more insoluble compound, to be at least a chemical equivalent of the reagent, then, the more insoluble precipitate is purified of its inclusions of the slightly less insoluble precipitates of the other metals by subjecting the original solution and precipitates to a prolonged agitation by means of which the soluble compound of the metal forming the more insoluble precipitate reacts with the precipitates of the other metals to form soluble compounds of said other metals and more of the insoluble precipitate which is being purified.

We find a particular application for our improved process in the separating of iron, copper and nickel from each other, each in the form of a precipitate substantially free of the others, when all are contained in the same original water solution.

We are aware that iron, copper and nickel have been taken from a water solution in the same order and by the same reagents that we use, but we are not aware that products anywhere nearly pure have been obtained in the manner embodying our improved process. However, in fact we do know that large amounts of the valuable metals have been lost in the iron precipitate in other processes.

The fact is well-known that, if two metals are present in a solution, and one of the metals forms a precipitate or an insoluble compound more insoluble than the corresponding compound of the second metal, and there is added to the solution the proper amount of a reagent capable of throwing down the first metal as a precipitate, then, said precipitate will in many cases carry down with it in insoluble form part of the second metal. This will happen, first, always in case the second metal is also capable of being precipitated by the reagent which is used, and secondly, often even if said second metal is not capable of being so precipitated.

As an example of the first case, if a solution of iron and nickel is treated with calcium hydrate, which reagent will precipitate either metal alone, and the reagent is added in the proper amount to precipitate the iron, the iron precipitate will always carry down some insoluble nickel. As an example of the second case, if a solution of iron and nickel, with ammonium chlorid present, be treated with ammonium hydrate, which reagent will precipitate iron alone with ammonium chlorid, but which will not precipitate nickel alone with ammonium chlorid, and the reagent be added in the proper amount to precipitate the iron, the iron precipitate will always carry down some insoluble nickel. In both of these cases, if the nickel were not present in the original solution in an amount much greater than the iron, the iron will predominate in the precipitate because ferric hydrate is more insoluble than nickel hydrate. The usual way in which these precipitations would be made in the laboratory would be to add to the solution of iron and nickel in a beaker the proper amount of reagent and agitate by means of a stirring rod until the mixture became homogeneous and then stop, the idea being that the precipitation of a certain amount of nickel in the iron was unavoidable and irremediable except, of course, by the use of some solvent (such as ammonium hydrate) which will dissolve nickel precipitates but will not dissolve iron precipitates.

We are not aware that it has been known that a slow subsequent action is possible by agitating the mixture in the presence of an excess of soluble salt of the metal forming the more insoluble precipitate, in this case iron, where by excess of soluble salt is meant, more salt than is necessary to enter into the the reaction under discussion, that of precipitation of the iron as insoluble salt with attendant solution of the nickel. It has always been considered impossible to get the iron out free of copper and nickel and in fact has been considered necessary to take out the iron by means of a weak alkali (followed by a strong alkali for the nickel) or else the iron precipitate would contain a very large amount of nickel.

By our improved method the iron may be precipitated by as strong an alkali as is used for the nickel, in fact all three metals, iron, copper and nickel, may be removed by the same reagent which may be strong or weak. The old method of purifying such a precipitate of the included metal, such, for instance, as the purifying of ferric hydrate of inclusion of nickel hydrate, is to separate the precipitate from the solution, dissolve it, for instance in an acid, and then reprecipitate with a proper amount of a suitable reagent, whereby all the iron is again thrown down and containing some nickel, but not so much of the latter as before, the difference of nickel being left in the second filtrate. The reason why the nickel exists in the second filtrate in less quantities than it does in the first is because in the acid solution it is in a more disseminated condition with regard to the iron than it was in the original solution, there being less nickel present, and only part of the nickel present being thrown down each time. Therefore a sufficient number of separations in sufficiently dilute solutions will accomplish a quantitative separation, giving all the nickel in the united filtrate which will be very dilute. This method is commonly used in quantitative analysis, and ordinarily four separations under good conditions are sufficient. Our method, however, as ordinarily practiced, while giving the precipitate practically pure, does not at one time remove from the solution all of the metal forming the most insoluble precipitate, because of the fact that the precipitate is afterwards purified by agitation in a solution containing an excess of a soluble salt of the metal which is being purified. Our method is, therefore, not applicable to quantitative analysis, but is applicable to the commercial separation of metals from a solution which is being supplied continuously to the cycle.

The following description sets forth in detail certain modes of carrying out the invention, such disclosed modes constituting but a part of the various ways in which the principle of the invention may be used.

The apparatus required to carry out our improved process consists of any suitable form of agitating and containing tanks, and filtering or settling devices, and is the same for the separation of iron, copper and nickel as it is for other metals and substances.

We have devised several methods for carrying out our invention; each of which depends for its improved result of obtaining substantially pure precipitates upon the comparative solubilities of the substantially insoluble precipitates which are thrown down from the original solution when a reagent is added thereto in an amount equal to the chemical equivalent of the metal which forms the more insoluble precipitate. Such invention is thus broadly set forth in our pending application Serial No. 300,728, filed February 12, 1906, where three of the several methods to which allusion is here made are described in detail. This our present application relates specifically to one of these methods only. In this method, the solution of iron, copper and nickel is agitated in any suitable vessel with powdered limestone in an amount equal to the chemical equivalent of the iron present in the solution, the result of which is the almost immediate precipitation of most of the iron as a hydrate, but even in a dilute solution there is some copper and nickel thrown down as basic carbonates. A prolonged agitation of the precipitates in the original solution purifies the iron precipitate of the included copper and nickel basic carbonates because of the comparative solubilities of the ferric hydrate and said basic carbonates, according to the following order of insolubility:

Most insoluble, $FeO_3H_3$,
Less insoluble, $CuCO_3.CuO_2H_2$ and $CuO_2H_2$,
Least insoluble, $NiCO_3.NiO_2H_2$ and $NiO_2H_2$.

The excess of iron salt in solution thus slowly dissolves, under the effect of vigorous agitation, the copper and nickel basic carbonates contained in the insoluble ferric hydrate, and precipitates in turn more ferric hydrate. For instance, suppose the original solution consists of the chlorids of iron, copper and nickel, then the following reactions take place:

$2FeCl_3 + 3CaCO_3 + 3H_2O + CuCl_2 + NiCl_2 = 2FeO_3H_3 + 3CaCl_2 + 3CO_2 +$ a little $CuCO_3.CuO_2H_2 +$ a little $NiCO_3.NiO_2H_2 + NiCl_2 + CuCl_2 +$ a little $FeCl_3$.

$3CuCO_3.CuO_2H_2 + 4FeCl_3 + 3H_2O$ agitated $= 6CuCl_2 + 3CO_2 + 4FeO_3H_3$.

$3NiCO_3.NiO_2H_2 + 4FeCl_3 + 3H_2O$ agitated $= 6NiCl + 3CO_2 + 4FeO_3H_3$.

After a prolonged agitation with a proper amount of reagent, the ferric hydrate is found to be substantially free of the included copper and nickel basic carbonates and the solution is found to be free of iron. The precipitate is separated and washed by any convenient method from the copper and nickel solution, the latter going into any suitable container. This copper and nickel solution is agitated with calcium hydrate to the chemical equivalent of the copper present, the result being the almost immediate precipitation of most of the copper as hydrate, which latter contains some nickel as hydrate. A prolonged agitation of this impure copper precipitate in the copper and nickel solution will purify said precipitate of the nickel because of the comparative solubilities of the precipitated hydrates. The excess of the soluble copper salt in the original solution thus slowly dissolves the nickel hydrate contained in the insoluble cupric hydrate and precipitates in turn more cupric hydrate. The reactions are as follows:

$$CuCl_2 + NiCl_2 + CaO_2H_2 = CuO_2H_2 + CaCl_2 + NiCl_2 + \text{a little } CuCl_2 + \text{a little } NiO_2H_2.$$
$$NiO_2H_2 + CuCl_2 \text{ agitated} = CuO_2H_2 + NiCl_2.$$

After a prolonged agitation with the proper amount of calcium hydrate the cupric hydrate is found to be substantially free of the nickel hydrate and the solution is free of copper. The cupric hydrate is separated and washed from the nickel solution, the latter going into any suitable container. This nickel solution is treated with suitable reagent, such as calcium hydrate, the result being the almost immediate precipitation of all of the nickel present, free from the iron and copper, without prolonged agitation, the reaction being:

$$NiCl_2 + CaO_2H_2 = NiO_2H_2 + CaCl_2.$$

Of course it will be remembered that the separation takes place as well with the salts of the other mineral acids and mixtures as it does with the chlorid solutions.

It is contemplated in the above description that the method of treatment herein described, is applicable not alone to the separation of iron from nickel and copper, but also to thus separating aluminum and combinations of these two metals, as also iron in both conditions of oxidation. So, too, what has been said with regard to the separation of nickel will apply equally where cobalt, and cobalt and nickel together, are to be separated from the other metals referred to.

We mean by the term "prolonged agitation" agitation for a length of time greater than that ordinarily required by a chemical reagent to act on a solution which is capable of being precipitated by it, and make the resulting mixture homogeneous.

We mean by the term "chemical equivalent of a reagent" such an amount of that reagent as actually and finally enters into the reaction, since the cores of some particles of insoluble reagent might not react and it would be necessary, therefore, to add the reagent in a quantity in excess of that representing the theoretical chemical equivalent.

We mean by the term "insoluble precipitates" those that are more insoluble than the hydrates of barium and calcium, for instance, the hydrates and carbonates of iron, aluminum, copper, nickel, etc.

It is a well-known law, of course, that the insoluble compounds tend to form and precipitate; for instance, the following reaction naturally takes place immediately:

$$CaO_2H_2 + MgCl_2 = MgO_2H_2 + CaCl_2.$$

However, our improved process cannot be classified as coming solely under this broad head, but rather is a simultaneous dissolving to the very slight amount possible, of the more soluble component of a substantially insoluble mixture, and a precipitation from the solution of the other metal which is contained also as the more insoluble compound in the original insoluble mixture.

There are several reagents any one of which might be used in certain steps of our process. Instead of calcium carbonate in the precipitation of the iron, other alkaline and alkaline earth carbonates and hydrates may be substituted, such as calcium hydrate and sodium hydrate. For the calcium hydrate in the copper precipitation there might be substituted such alkaline or alkaline earth carbonates and hydrates as calcium carbonate, sodium hydrate and sodium carbonate. If any one of the three metals, iron, copper and nickel, is absent, the other two may be separated and purified as described above, simply omitting the steps required by our process for that particular metal which is absent. For instance, iron could be separated from nickel alone; from copper alone; or copper could be separated from nickel alone.

It sometimes happens that a change of temperature from the ordinary is an aid to the separation by causing an appreciable difference in the slight solubilities of the two insoluble substances, which have, at ordinary temperatures, solubilities so nearly identical that an economic separation is prevented. For instance, compounds of cobalt and nickel might have substantially the same solubilities at a temperature of 20 degrees; whereas at 60 degrees their solubilities might be so different as to allow of an economic separation by our process. If, at any time, more of the reagent is added than the chemical equivalent of the metal to be precipitated, the condition of equilibrium can be restored by the addition of more of the original solution, which amounts, in effect, to the adding of the chemical equivalent.

Our method does not give dilute solutions and yet we obtain pure precipitates of the iron, copper and nickel instead of the impure precipitates which are obtained by present methods, and the basic principle of our process is the purification of any precipitated metal or substance of the inclusions of other precipitated metals or substances slightly more soluble than the first, all of the precipitates being substantially insoluble—although nothing is absolutely insoluble in a solvent—by means of agitating such impure precipitate in a solution containing soluble salts of the more insoluble metal. We do not confine ourselves to the use of water as a solvent for obtaining the original solution. Where both or all of the metals in solution are capable of being precipitated by the reagent used, there has often been left and lost as much as 25% impurity, for instance, of nickel in the iron; whereas, we are able, by our method, to free the iron precipitate entirely of the nickel impurity by a sufficiently long and vigorous agitation. Our method, of course, works best on substances which, although insoluble, are colloidal and freely disseminated, since, thus, infinitely great surfaces are constantly presented for solution and subsequent immediate action of the soluble salt.

We wish to point out that, if the addition of the required amount of reagent be made so gradually that it extends over a considerable length of time during which agitation is going on, this amounts in substance to "adding the required amount of reagent and then subjecting the mixture to prolonged agitation." Finally we should state that by the expression, "the metal which is being purified," as used in the description and claims, we mean the metal which we are trying to remove as a precipitate free of the other metals.

Other modes of applying the principle of our invention may be employed instead of the one explained, change being made as regards the process herein disclosed, provided the step or steps stated by any one of the following claims or the equivalents of such stated step or steps be employed.

We therefore particularly point out and distinctly claim as our invention:—

1. In a process of separating one metal substantially free from another, such metals being contained in a solution, the steps which consist in adding to the solution a reagent capable of producing a relatively insoluble precipitate with one of the metals, such reagent being added in an amount equal to the chemical equivalent of said one metal; and then agitating the resultant mixture until any inclusions of the other metals are substantially dissolved out.

2. In a process of separating metals, each substantially free from the others, such metals being contained in a solution, the steps which consist in repeating the following cycle of operations until each metal has been successively separated out; adding to the solution a reagent capable of producing a relatively insoluble precipitate with that metal which it is desired to separate out, such reagent being added in an amount equal to the chemical equivalent of such metal; agitating the resultant mixture until such precipitate is purified of inclusions of the other metals; and then removing the precipitate.

3. In a process of separating one metal substantially free from another, such metals being contained in a solution, the steps which consist in adding to the solution a reagent capable of producing substantially insoluble precipitates with said metals, one precipitate, however, varying from the other in its degree of solubility, such reagent being added in an amount equal to the chemical equivalent of one of said metals; and then agitating the resultant mixture until the more soluble precipitates are substantially re-dissolved.

4. In a process of separating metals in solution, the steps which consist in adding to the solution a reagent capable of forming substantially insoluble precipitates with said metals, one precipitate, however, being slightly less soluble than the others, such reagent being added in an amount equal to the chemical equivalent of such less soluble precipitate; and then purifying such less soluble precipitate of the inclusions of the other precipitates by agitating the same in a solution of the metal forming such less soluble precipitate until such other precipitates are substantially redissolved.

5. In a process of separating metals in solution, the steps which consist in adding to the solution a reagent capable of forming substantially insoluble precipitates with said metals, one precipitate, however, being slightly less soluble than the others, such reagent being added in an amount equal to the chemical equivalent of such less soluble precipitate; and then purifying such less soluble precipitate of the inclusions of the other precipitates by agitating the same in a solution containing soluble salts of the metal forming such less soluble precipitate until such other precipitates are substantially redissolved.

6. In a process of separating metals in solution, the steps which consist in adding to the solution a reagent capable of forming substantially insoluble precipitates with said metals, one precipitate, however, being slightly less soluble than the others, such reagent being added in an amount equal to the chemical equivalent of such less soluble precipitate; and then purifying such less soluble precipitate of the inclusions of the other precipitates by agitating the mixture resulting upon the addition of such reagent until the other precipitates are substantially redissolved.

7. In a process of separating metals in solution, the steps which consist in adding to the solution a reagent capable of forming substantially insoluble precipitates with said metals, one precipitate, however, being slightly less soluble than the others, such reagent being added in an amount equal to the chemical equivalent of the metal producing such less soluble precipitate; purifying such less soluble precipitate of the inclusions of the other precipitates by agitating the mixture resulting upon the addition of such reagent until such other precipitates are redissolved; removing such purified precipitate; and then repeating the foregoing series of steps with the remaining solution until all the metals are separated.

8. In a process of separating two metals in solution, the steps which consist in adding to the solution a reagent capable of forming substantially insoluble precipitates with said metals, one precipitate, however, varying slightly from the other in its degree of solubility, such reagent being added in an amount equal to the chemical equivalent of the metal producing the less soluble precipitate; and then purifying such less soluble precipitate of the inclusions of the other by agitating the same in a solution forming such less soluble precipitate until such inclusions are redissolved.

9. In a process of separating two metals in solution, the steps which consist in adding to the solution a reagent capable of forming substantially insoluble precipitates with said metals, one precipitate, however, varying slightly from the other in its degree of solubility, such reagent being added in an amount equal to the chemical equivalent of the metal producing the less soluble precipitate; and then purifying such less soluble precipitate of the inclusions of the other by agitating the same in a solution containing soluble salts of the metal forming the less soluble precipitate until such inclusions are redissolved.

10. In a process of separating two metals in solution, the steps which consist in adding to the solution a reagent capable of forming substantially insoluble precipitates with said metals, one precipitate, however, varying slightly from the other in its degree of solubility, such reagent being added in an amount equal to the chemical equivalent of the metal producing the less soluble precipitate; and then purifying such less soluble precipitate of the inclusions of the other by agitating the mixture resulting upon the addition of such reagent until such inclusions are redissolved.

11. In a process of separating iron and nickel in solution, the steps which consist in adding to the solution a reagent capable of producing an insoluble precipitate with the iron, such reagent being added in an amount limited to the chemical equivalent of the iron; and then agitating the mixed solution and precipitate until any inclusions of nickel are redissolved.

12. In a process of separating iron and nickel in solution, the steps which consist in adding to the solution a reagent capable of producing substantially insoluble precipitates with said iron and nickel, the iron precipitate, however, being slightly less soluble than the nickel precipitate, such reagent being added in an amount limited to the chemical equivalent of the iron; and then purifying such iron precipitate of inclusions of nickel precipitate by agitating the mixed solution and precipitate until any inclusions of nickel are redissolved.

13. In a process of separating iron, copper, and nickel in solution, the steps which consist in adding to the solution a reagent capable of producing a relatively insoluble precipitate with the iron, such reagent being added in an amount limited to the chemical equivalent of the iron; agitating the mixed solution and precipitate until any inclusions of copper and nickel are redissolved; removing the iron precipitate; adding to the filtrate a reagent capable of producing a relatively insoluble precipitate with the copper, such reagent being added in an amount limited to the chemical equivalent of the copper; and then agitating the mixed solution and precipitate until any inclusions of nickel are redissolved.

14. In a process of separating iron, copper, and nickel in solution, the steps which consist in adding to the solution a reagent capable of producing substantially insoluble precipitates with said metals, the iron precipitate however, being slightly less soluble than the copper and nickel precipitate, such reagent being added in an amount limited to the chemical equivalent of the iron; agitating the mixed solution and precipitate until any inclusions of copper and nickel are redissolved removing the iron precipitate; adding to the filtrate a reagent capable of producing a substantially insoluble precipitate with the copper and nickel, the copper precipitate, however, being slightly less soluble than the nickel precipitate, such reagent being added in an amount limited to the chemical equivalent of the copper; agitating the mixed solution and precipitate until any inclusions of nickel are redissolved; and then removing the copper precipitate.

15. In a process of separating iron and nickel in solution, the steps which consist in adding calcium carbonate in an amount equal to the chemical equivalent of the iron, whereby the major portion of such iron is precipitated as hydrate together with a small portion of nickel as basic carbonate; and then purifying such iron precipitate of the inclusions of the nickel precipitate by agitating the mixed solution and precipitate until the remainder of the iron in the solution is precipitated.

16. In a process of separating iron, copper, and nickel in solution, the steps which consist in adding calcium carbonate to the solution in an amount equal to the chemical equivalent of the iron, whereby the major portion of such iron is precipitated as hydrate together with small portions of copper and nickel as basic carbonates; purifying such iron precipitate of the inclusions of copper and nickel precipitate by agitating the mixed solution and precipitates until the remainder of the iron in the solution is precipitated; removing the iron precipitate; adding to the remaining solution calcium hydrate to the chemical equivalent of the copper therein, whereby the major portion of such copper, together with some nickel, is precipitated as hydrate; purifying such copper precipitate of the inclusions of nickel precipitate by agitating the mixed solution and precipitates until the remainder of the copper in the solution is precipitated; and then removing the copper precipitate.

Signed by HERBERT H. DOW, this 15th day of March, 1907.

HERBERT H. DOW.

Attested by—
 D. S. DAVIES,
 JNO. F. OBERLIN.

Signed by WALTER S. GATES, this 4th day of January, 1907.

WALTER S. GATES.

Attested by—
 A. N. PATRIARCHE,
 THOS. GRISWOLD, Jr.